United States Patent [19]

Lewandowski et al.

[11] Patent Number: 4,710,330
[45] Date of Patent: Dec. 1, 1987

[54] APPLICATION OF THE LASER JET METHOD FOR INSCRIBING OFFICE MACHINE KEYBOARD BUTTONS

[75] Inventors: Dieter Lewandowski; Rolf Ostermoor, both of Wilhelmshaven; Dieter Spranger, Schortens, all of Fed. Rep. of Germany

[73] Assignee: Olympia Aktiengesellschaft, Fed. Rep. of Germany

[21] Appl. No.: 820,693

[22] Filed: Jan. 21, 1986

[30] Foreign Application Priority Data

Jan. 26, 1985 [DE] Fed. Rep. of Germany ....... 3502678

[51] Int. Cl.[4] .................. B29C 71/04; B29C 35/08
[52] U.S. Cl. .................. 264/25; 219/121 L; 219/121 LM; 219/121 LB; 264/40.2; 264/40.7; 264/132; 425/174.4; 425/174.8 R
[58] Field of Search ............ 264/25, 80, 132, 40.1, 264/40.7, 40.2; 219/121 L, 121 LM, 121 LB; 425/174.4, 174.8 R

[56] References Cited

U.S. PATENT DOCUMENTS 3,549,733 12/1970 Caddell ........................ 264/25
4,307,047 12/1981 Edinger et al. ................. 264/25
4,391,764 7/1983 Edinger et al. ................. 264/25

FOREIGN PATENT DOCUMENTS 2936926 11/1982 Fed. Rep. of Germany .
3044722 11/1982 Fed. Rep. of Germany .
53-00255 1/1978 Japan ........................ 264/245
58-57916 4/1983 Japan ......................... 264/25
58-130177 8/1983 Japan ........................ 264/132
60-21236 2/1985 Japan ......................... 264/25
835120 5/1960 United Kingdom .

Primary Examiner—Jeffery Thurlow
Attorney, Agent, or Firm—Wood, Herron & Evans

[57] ABSTRACT

A process for inscription of parts from plastic material whose color can be changed through the effect of an energy radiation used for providing alphanumeric characters or other symbols on the key buttons of a keyboard. The office machine keyboard completely equipped with blank key buttons is for that purpose moved relative to the energy radiation, for instance a laser beam, with the coordinated character or symbol being inscribed on each key button by the energy radiation in accordance with stored data as the key button proceeds into the effective area of the energy radiation.

7 Claims, 1 Drawing Figure

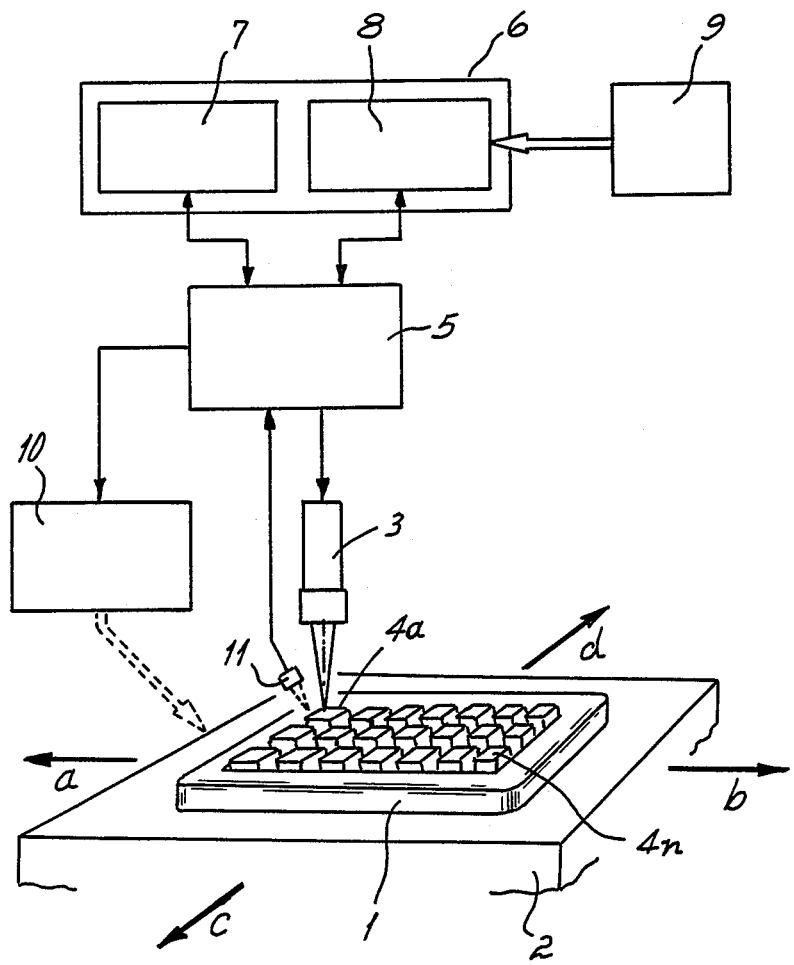

APPLICATION OF THE LASER JET METHOD FOR INSCRIBING OFFICE MACHINE KEYBOARD BUTTONS

BACKGROUND OF THE INVENTION

The present invention relates to the manufacture of typewriters or other office machine keyboards and is particularly directed to a method for producing an inscription on key buttons. The key buttons consist of plastic material which changes colors under the effect of energy radiation.

Using energy radiation, specifically laser radiation, for inscribing various materials has been known for some time. In addition to burning methods where the energy beam causes a melting of the surface, for instance of metallic materials, according to the contours drawn by the beam or where the energy beam changes a coating applied on the part to be inscribed, it is also known, for instance from the German patent document No. 29 36 926, to make the parts to be inscribed from plastic which changes color under the effect of the energy radiation, in its effective area. Cited as an example in said patent document is the inscription of plastic appliance keys which are produced as identical plastic parts, by injection molding using a uniform tool, and which receive their inscription thereafter by energy radiation.

As compared to a key manufacture where the keys are injection-molded in two colors, provided with characters and symbols, the previous laser jet method offers the advantage of reduced inventory and tool costs. But a factor which increases costs is that each individual uninscribed key must be withdrawn from inventory, fed to the inscribing appratus and, after inscription, undergo an intermediate storage for installation in various devices, ordered by characters and symbols.

The problem underlying the invention is to provide a method which further economizes the inscription of key buttons for office machine keyboards.

SUMMARY OF THE INVENTION

In accordance with the present invention, the key buttons are mounted upon completed typewriters or office machine keyboards which keyboards are in the installed and completely assembled typewriters or calculators. The keyboards are moved relative to an energy radiation supply; for example, a laser beam in such a manner that each keyboard is successively brought into the effective area of energy radiation. A memory has stored in it all characters and symbols to be inscribed on the new button. This memory is part of a control unit which controls the deflection of the energy radiation supply so that as each key is positioned in the radiation path it is inscribed with the proper character or symbol.

The advantages of the invention specifically consist in the fact tht complete office machine keyboards, which even may be installed in completely assembled office machines—may be equipped entirely with blank key buttons, so that during the equipping operation no attention need be paid to any coordination of specific key buttons with specific keys. This simplified not only the stocking of the identical plastic componenets, as previously known from the state of the art, but eliminates also the operations of removing individual keys for inscription, sorted intermediate storage of inscribed keys, and the selective equipping of the keyboards. Prior to inscription of the key buttons, the keyboards are equipped with blank key buttons, so that the tooling expense is very low.

A further advantage of the inventions lie in the possibility of predetermining the arrangement of various characters or symbols on different keyboards by simple program changes with the aid of a data input device. This makes it possible to change over to different keyboard arrangements during the inscription process of several keyboards, without appreciable interruptions or retooling times, so that a simplification in controlling the production sequence is achieved as well.

DESCRIPTION OF THE DRAWING

The FIGURE is a schematic diagram of a laser jet system for inscribing keyboard buttons.

DETAILED DESCRIPTION OF THE PREFERRED EMBODIMENT

A preferred embodiment of the invention will be explained hereafter with reference to the FIGURE. This basic illustration shows a keyboard 1 arranged on a carriage 2 which can be moved, underneath an inscription head 3, in two coordinate directions indicated by arrows a, b; c, d. The keyboard 1 is completely equipped with keys in rows and columns, each featuring key buttons 4a through 4n, as can be seen in the figure.

The key buttons 4a through 4n are made from plastic which changes color in the effective area of an energy radiation and are entirely blank. The plastic material of the key buttons may suitably be of gray color and change to black under the effect of the energy radiation. Such plastic materials have been known for some time and have been described, e.g., in the British Pat. document No. 835 120 or the German patent document No. 30 44 722.

The inscription head 3 comprises an energy radiation supply generating a laser beam. A deflection device of the type well known in the art in the inscription head 3 makes it possible to deflect the laser beam within a limited area so that, under appropriate control, alphanumeric characters or any other symbols may be inscribed.

Provided for controlling the device is a control unit 5 featuring, e.g., a microprocessor, and interacting with a memory 6. The memory 6 comprises a program memory 7 and a data memory 8. The data memory 8 can be loaded with input data with the aid of a data input device 9, for instance a magnetic recording media reader, a punched paper tape reader, or a keyboard.

The program memory 7 contains the program routines necessary for the operation of the control unit 5 and, additionally, a character generator. When the laser beam of the inscribing head 3 is to inscribe a character, that is, the beam is to be deflected in accordance with the character shape, the data pertaining to this character and required for controlling the deflection are read by the control unit 5 from the character generator of the program memory 7 and used to control the inscribing head 3. The motors and other elements required for moving the carriage 2 are symbolically combined in the figure in a single block, as carriage drive 10. The control unit 5 delivers to the carriage drive 10 the necessary control signals which produce a feed advancing from key button 4a to key button 4n. A position scanner 11 formed, e.g., by a photooptical device known as such recognizes when a key button is located in the effective area of the inscribing head 3 in a defined position and sends a feedback signal to the control unit 5, which subsequently activates the inscribing head for producing the inscription of the pertinent character or symbol.

The date entered in the data memory 8 by means of the input device 9 indicate the assignment of various characters and symbols to the keyboard. That is, the control unit 5 can retrieve from the data memory 8 which character or symbol is to be inscribed, as the keyboard 1 continues to move in the predetermined direction, on the key button which is then being positioned in the effective area of the inscribing head 3. With the aid of the information retrieved from the data memory 8, the control unit 5 then reads the pertinent control data from the character generator in the program memory 7 and, as soon as the feedback signal from the position scanner is available indicating that the inscribing position has been assumed, activates the inscribing head 3 in the appropriate manner. Once the inscribing operation is completed, the control unit 5 causes the carriage drive 10 to shift the carriage 2, and thus the keyboard 1 to the next key, retrieves from the data memory 8 the information (selection data) for the next character or symbol to the inscribed, and retrieves from the character generator in the program memory 7 the data for controlling the inscribing head 3 in accordance with the character of symbol etc. to be inscribed.

The keyboard 1 arranged on the carriage 2 may be shifted both in longitudinal direction (arrows a, b) and in transverse direction (arrows c, d), depending on whether the key buttons of the keyboard 1 are arranged in only one or in several parallel rows. With the key buttons 4a through 4n arranged in several columns and several parallel rows—as presented in the figure—the keyboard 1 may be shifted, e.g., first in the direction of arrow a until all key buttons of a row have been inscribed. Next, the keyboard 1 would be shifted in the direction of arrow d until the inscribing head 3 is located above the second key button row, whereafter the keyboard 1 would be moved in the direction of arrow b. Shifting the keyboard 1 once again in the direction of arrow d would then move the third key button row in the effective area of the inscribing head 3 so that, when subsequently shifting in the direction of arrow a, also the third key button row shown in the figure could be inscribed. Next, the carriage 2 would be restored to its home position in the directions of arrows c and b. The respective stepwise shift of the carriage 2, and thus the keyboard 1, is performed by the carriage drive 10 always upon instruction by the control unit 5.

If the laser beam deflection of the inscribing head 3 is capable of covering an area larger than that of only one key button, the control may also be such that always several key buttons located in the effective area of the inscribing head 3 are inscribed before the carriage 2 with the keybord 1 is moved. Additionally, since the inscribing process of each character or symbol takes place at high speed, it is not absolutely necessary to move the carriage 2 and keyboard 1 stepwise. Rather, a flawless inscription is possible also with a continuous movement of the keyboard 1. All that is necessary is activating the inscribing head 3 in such synchronism with moving the keyboard 1 that the characters or symbols will be inscribed each at the intended location. As already described, this synchronization may be controlled and maintained by feedback of the position scanner 11, but it is possible as well to arrange the keyboard 1 that is to be inscribed on the carriage 2 in a defined position and perform the activation of the inscribing head 3 and of the carriage drive in an accurately coordinated time relation. using a position scanner would then not be necessary.

The described embodiment provides for having a character generator in the memory 6 and/or program memory 7. But it is possible as well to enter the information necessary for deflecting the energy beam in accordance with the character and/or symbol direct, by means of the data input device 9 into the data memory 8, so that the control unit 5 receives all information required for controlling the inscribing head 3 direct, by access to the data memory 8. Such an embodiment would not require providing a character generator. In another variant, also the data and information for different keyboard layouts could be contained in the memory 6 so that the data and/or information set for a desired keyboard layout could be selected by means of a simple selection facility, for instance a selector switch, and released for access by the control unit 5.

It is to be understood that a keyboard completely equipped with keys and key buttons and to be inscribed by the inventional process may be installed, prior to inscription in a completely assembled machine, for instance a typewriter or calculator. For the sequence of the process it is immaterial whether the keybord to be brought into the effective area of the energy radiation is arranged in a housing of its own or in the housing of a machine.

It is to be understood that the term "office machine" as used in the following claims includes various office machines, such as typewriters, calculators and the like.

What is claimed is:

1. The method of producing an inscription on key buttons, said key buttons consisting of plastic material which changes color under the effect of energy radiation, said key buttons being mounted on a keyboard, said keyboard being adapted to be installed as a unit in a completely assembled office machine, said method comprising the steps of moving said keyboard relative to an energy radiation supply to bring each blank key button successively into the effective area of the energy radiation, storing in a memory of a control unit for controlling the deflection of the energy radiation control data for all characters and symbols to be inscribed on the blank key buttons, and upon the keyboard reaching each new inscription position deflecting the energy radiation supply so that the character or symbol coordinated with this position is inscribed on one of said key buttons by the energy radiation in accordance with the respective control data retrieved from the said memory.

2. The method of claim 1, including the step of loading data memory in the said memory of the control unit by means of a data entering device, said control data, comprising data for deflecting the energy radiation for the characters or symbols of at least one completely equipped keyboard.

3. The method of claim 1, including the steps of storing in a character generator provided in the said memory of the control unit control data for deflecting the energy radiation for all applicable characters or symbols, and storing in said data memory interacting with the character generator, by means of a data entering device, selection data for a sequence of control data of the characters or symbols of the keyboard to be inscribed, in accordance with successively located inscription positions.

4. The method of claim 3 including the step of moving said keyboard and said energy radiation supply relative to one another stepwise in at least one direction.

5. The method of claim 4 including the step of determining the position of said keyboard relative to said energy radiation supply by means of a position scanner and supplying a signal correlated with said position to the control unit which controls the energy radiatin in response thereto.

6. The method of claim 1 in which said energy radiation supply is a laser beam.

7. The method of claim 6 in which said keyboard is installed in a complete office machine and both said keyboard and said office machine are moved as a unit relative to said energy radiation supply.

* * * * *